United States Patent
Clark

(10) Patent No.: US 10,907,689 B2
(45) Date of Patent: Feb. 2, 2021

(54) HEAVY DUTY WHEEL SEAL WITH DRY RUNNING RESISTANCE

(71) Applicant: Freudenberg-NOK General Partnership, Plymouth, MI (US)

(72) Inventor: Keith Clark, Rumney, NH (US)

(73) Assignee: FREUDENBERG-NOK GENERAL PARTNERSHIP, Plymouth, MI (US)

( * ) Notice: Subject to any disclaimer, the term of this patent is extended or adjusted under 35 U.S.C. 154(b) by 168 days.

(21) Appl. No.: 16/014,094

(22) Filed: Jun. 21, 2018

(65) Prior Publication Data

US 2019/0390775 A1    Dec. 26, 2019

(51) Int. Cl.
| | |
|---|---|
| *F16C 33/78* | (2006.01) |
| *F16J 15/3232* | (2016.01) |
| *F16J 15/3256* | (2016.01) |
| *F16J 15/3264* | (2016.01) |

(52) U.S. Cl.
CPC ...... *F16C 33/7883* (2013.01); *F16C 33/7886* (2013.01); *F16C 33/7889* (2013.01); *F16J 15/3256* (2013.01); *F16J 15/3264* (2013.01); *F16C 33/7813* (2013.01); *F16C 2326/02* (2013.01); *F16J 15/3232* (2013.01)

(58) Field of Classification Search
CPC .......... F16J 15/3256; F16J 15/3264; F16C 33/7813; F16C 33/7883; F16C 33/7889
See application file for complete search history.

(56) References Cited

U.S. PATENT DOCUMENTS

| | | | |
|---|---|---|---|
| 3,086,781 A | | 4/1963 | Hudson et al. |
| 3,114,558 A | | 12/1963 | Rhoads et al. |
| 3,341,265 A | | 9/1967 | Paterson |
| 4,208,057 A | | 6/1980 | Messenger |
| 4,285,526 A | | 8/1981 | Klinteberg et al. |
| 4,432,557 A | | 2/1984 | Drucktenhengst |
| 4,962,936 A | * | 10/1990 | Matsushima ........ F16J 15/3256 277/364 |
| 5,002,287 A | * | 3/1991 | Eskilsson ................ G01P 3/443 277/317 |
| 5,004,248 A | | 4/1991 | Messenger et al. |
| 5,096,207 A | * | 3/1992 | Seeh .................... F16J 15/3256 277/353 |
| 5,186,472 A | | 2/1993 | Romero et al. |
| 5,211,406 A | * | 5/1993 | Katzensteiner ...... F16J 15/3256 277/351 |

(Continued)

*Primary Examiner* — Nicholas L Foster
(74) *Attorney, Agent, or Firm* — Daniel J. Sepanik, Esq.; Harness, Dickey & Pierce, P.L.C.

(57) ABSTRACT

A sealing arrangement includes a stationary spindle and a wheel hub rotatably mounted to the spindle. A seal assembly is disposed between the spindle and the wheel hub and includes an outer carrier case having a first cylindrical portion disposed in the inner bore of the wheel hub and a first radial portion extending radially inward from an end of the first cylindrical portion. An inner seal element has an inner metal case having cylindrical portion received on an outer surface of the stationary spindle and includes an annular portion extending radially outwardly from an end of the cylindrical portion and axially spaced from the first radial portion of the outer carrier case. An oil seal lip extends radially outwardly and axially from the annular portion of the inner metal case and engages the first radial portion of the outer carrier case.

15 Claims, 2 Drawing Sheets

(56) References Cited

U.S. PATENT DOCUMENTS

Figure 1:
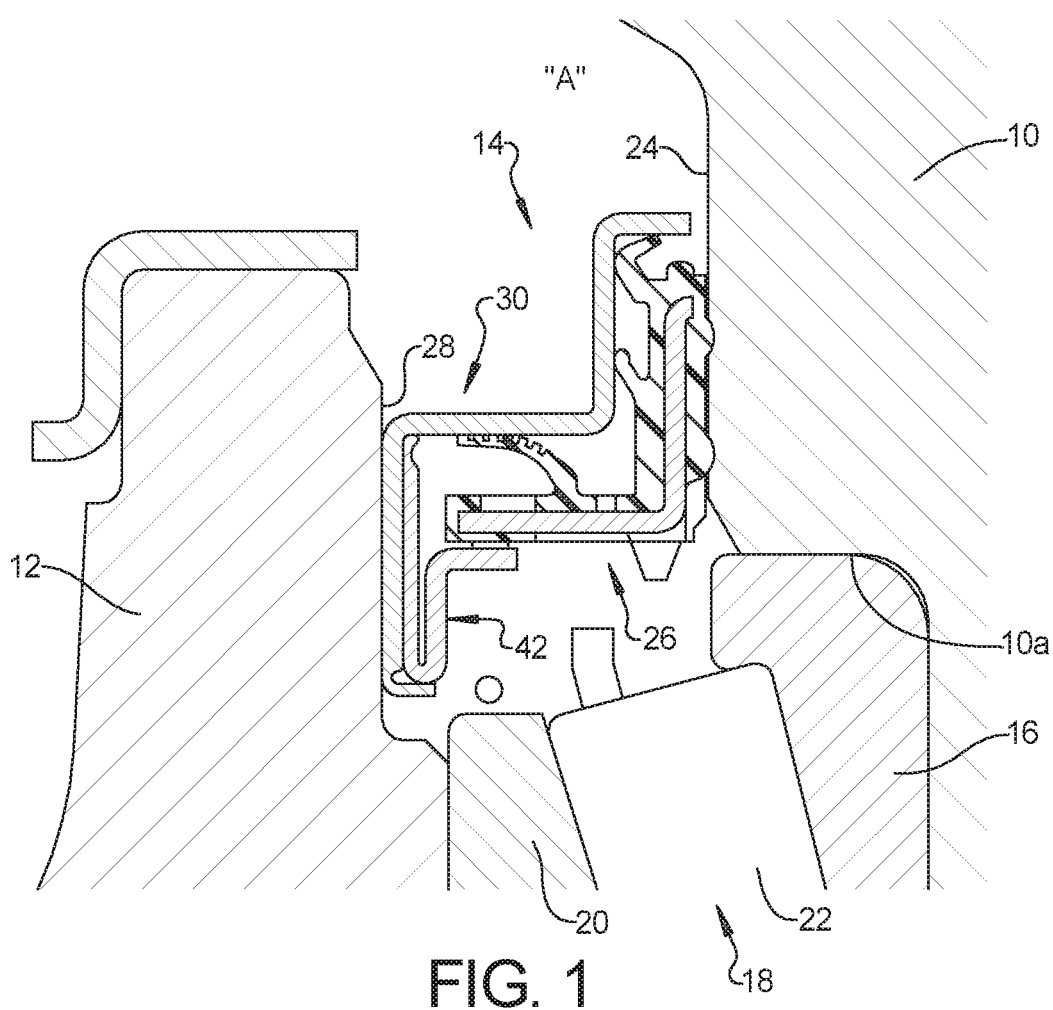

| | | | |
|---|---|---|---|
| 5,575,568 A * | 11/1996 | Rigaux | F16C 33/7879 |
| | | | 384/448 |
| 5,649,710 A | 7/1997 | Kanda | |
| 5,944,321 A * | 8/1999 | Niebling | F16C 33/7879 |
| | | | 277/549 |
| 5,975,534 A | 11/1999 | Tajima et al. | |
| 6,450,503 B1 | 9/2002 | Dossena et al. | |
| 6,471,211 B1 | 10/2002 | Garnett et al. | |
| 6,776,420 B2 | 8/2004 | Vignotto et al. | |
| 6,991,234 B2 | 1/2006 | Oldenburg | |
| 7,056,028 B2 | 6/2006 | Hosoda et al. | |
| 7,063,193 B2 | 6/2006 | Yoshida | |
| 7,232,129 B2 | 6/2007 | Kobayashi | |
| 7,334,942 B2 * | 2/2008 | Cha | F16C 33/7883 |
| | | | 384/480 |
| 7,464,939 B2 | 12/2008 | Matsui | |
| 7,658,386 B2 | 2/2010 | Oldenburg | |
| 7,793,939 B2 | 9/2010 | Ishikawa et al. | |
| 7,926,816 B2 | 4/2011 | Shibayama et al. | |
| 7,931,278 B2 | 4/2011 | Krulis et al. | |
| 8,087,673 B2 | 1/2012 | Kobayashi | |
| 8,196,933 B2 * | 6/2012 | Denton | F16J 15/3268 |
| | | | 277/576 |
| 8,336,886 B2 | 12/2012 | Berdichevsky et al. | |
| 8,474,825 B2 | 7/2013 | Nakagawa | |
| 8,820,751 B2 * | 9/2014 | Denton | F16J 15/3268 |
| | | | 277/576 |
| 8,828,178 B2 | 9/2014 | Yamamoto et al. | |
| 9,651,155 B2 * | 5/2017 | Angiulli | F16J 15/3268 |
| 10,240,677 B2 * | 3/2019 | Angiulli | F16C 33/7823 |
| 2002/0011710 A1 * | 1/2002 | Oldenburg | F16J 15/3256 |
| | | | 277/612 |
| 2004/0056428 A1 | 3/2004 | Yoshida | |
| 2004/0201179 A1 | 10/2004 | Iwakata et al. | |
| 2004/0228558 A1 * | 11/2004 | Cha | F16C 33/7883 |
| | | | 384/486 |
| 2006/0012129 A1 * | 1/2006 | Oldenburg | F16J 15/3256 |
| | | | 277/572 |
| 2009/0322032 A1 | 12/2009 | Kanzaki | |
| 2011/0089642 A1 | 4/2011 | Terasawa | |
| 2012/0126490 A1 | 5/2012 | Maskaliunas et al. | |
| 2013/0127119 A1 | 5/2013 | Haepp et al. | |
| 2016/0298769 A1 * | 10/2016 | Angiulli | F16C 33/7823 |
| 2016/0298771 A1 * | 10/2016 | Angiulli | F16C 33/7823 |

* cited by examiner

HEAVY DUTY WHEEL SEAL WITH DRY RUNNING RESISTANCE

FIELD

The present disclosure relates to a heavy duty wheel seal and more particularly to a heavy duty wheel seal with dry running resistance.

BACKGROUND

This section provides background information related to the present disclosure which is not necessarily prior art.

Radial shaft seals for rotating hub applications often suffer from dry running conditions due to the centrifugal effects of the rotating hub. Especially at high rotation speeds, when lubrication of the seal is most critical, the lubricant being sealed is slung out to the hub periphery resulting in inadequate lubrication of the seal lip, which causes increased friction heat and damage to the oil seal resulting in leakage.

Radial shaft seals for rotating hub applications normally have the oil seal lip attached to the rotating hub. During rotation centrifugal forces create lifting of the lip, so these oil seals require stiffer lips and garter springs to hold the lip tight to the mating surface. The additional loading required to maintain sealing contact at peak operating speeds results in higher friction and heat during normal, lower speed operation.

Cassette style radial shaft seals for rotating hub applications are frequently used in applications where the installation forces of the inner element are transferred through the seal. These seals include features where the forces are transferred, resulting in compaction of the spacer feature within the seal. The contact forces stored in the spacer add friction and heat during use. It is desirable to reduce the friction to lower the power losses and heat generated by the seal during use.

Some prior seals have been configured with outward facing radial lips mounted to the stationary axle spindle and positioned near the outer periphery, but these designs have not been effective configurations since it requires rubber lip to be compressed into the assembled condition rather than stretched. The compressed condition is poor for sealing since discontinuities will occur about the circumference in response to the compression.

SUMMARY

This section provides a general summary of the disclosure, and is not a comprehensive disclosure of its full scope or all of its features.

In view of the above-discussed deficiencies, the present disclosure utilizes an axial contacting oil seal lip with the oil seal lip attached to the stationary spindle. Additionally, the sealing interface is located near the outer periphery of the sealed cavity such that lubricant cannot be slung out beyond the sealing interface. The lip is inclined outward toward the periphery such that the centrifugal forces developed during use can contribute to the sealing function. Because the lip is inclined outward and making axial contact, the rubber lip material is stretched to achieve the assembled condition. The seal incorporates a spacer feature on the oil side of the seal main lip, near the outer periphery such that the spacer feature can be lubricated by the application lubricant thereby reducing friction and heat compared to the spacer feature running dry or with only initial lubrication.

The sealing arrangement includes a stationary spindle and a wheel hub rotatably mounted to the spindle. A seal assembly is disposed between the spindle and the wheel hub and includes an outer carrier case having a first cylindrical portion disposed in the inner bore of the wheel hub and a first radial portion extending radially inward from an end of the first cylindrical portion. An inner seal element has an inner metal case having a cylindrical portion received on an outer surface of the stationary spindle and includes an annular portion extending radially outwardly from an end of the cylindrical portion and axially spaced from the first radial portion of the outer carrier case. An oil seal lip extends radially outwardly and axially from the annular portion of the inner metal case and engages the first radial portion of the outer carrier case.

According to a further aspect of the present disclosure, a cassette type radial shaft seal is provided for rotating hub applications such as a wheel seal for full float axles. The seal incorporates a number of features to address problems with dry running and excessive friction frequently encountered in these applications. The seal is constructed with the oil seal lip mounted to the inner portion such that it remains stationary and is not subject to centrifugal loading during use. It can therefore be more lightly loaded to minimize friction and heat. The oil seal lip is oriented in an outward facing manner such that the centrifugal forces acting on lubricant present at the dynamic seal interface act to promote sealing during the dynamic condition. The oil seal lip is stretched into the assembled condition to ensure that it can develop a consistent contact around the entire circumference with no weak spots due to compression of the rubber lip. The lip is placed near the outer periphery of the seal envelope to ensure adequate lubricant supply over a broad range of operating speeds, and to be able to withstand lower overall lubricant levels without dry running condition at the dynamic sealing interface. Further resistance to dry running is achieved by forming a trough to retain lubricant oil at the oil side of the seal. The spacer feature used to position the inner seal is at the oil side, and likewise near the outer periphery allowing it to receive a continuous supply of lubrication during use.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
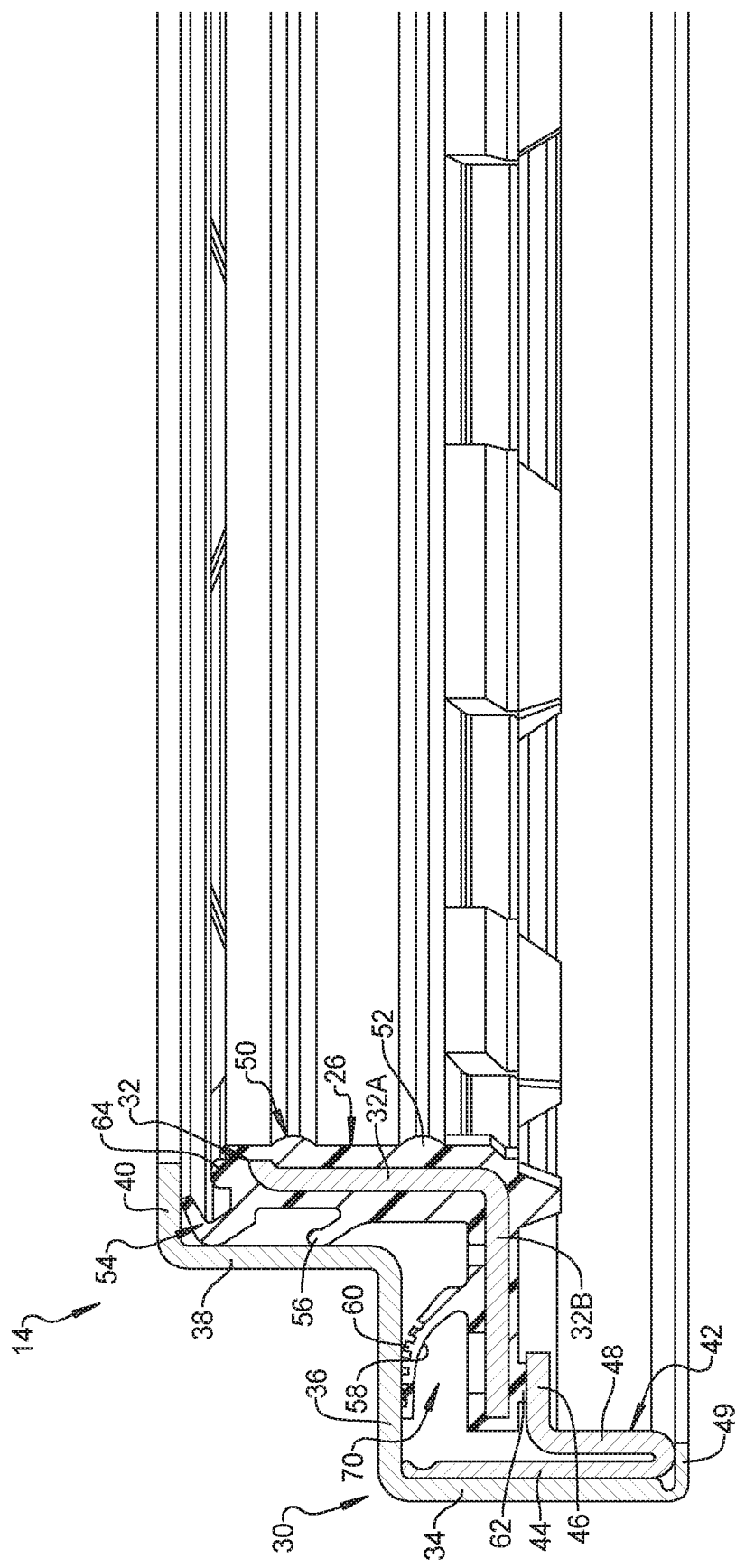

FIG. 1 is a partial cross-sectional view of an axle spindle and wheel hub assembly including a wheel seal according to the principles of the present disclosure; and FIG. 2 is a cross-sectional view of the wheel seal shown in FIG. 1.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

With reference to FIG. 1, an axle spindle 10 and wheel hub 12 are shown assembled with a heavy duty wheel seal 14 assembled therebetween. The axle spindle 10 is stationary and includes a recessed shoulder 10a that receives an inner race 16 of a bearing assembly 18 that also includes an outer race 20 that is received on an inner surface of the wheel hub 12. A plurality of roller bearings 22 are disposed between the inner race 16 and the outer race 20. The axle spindle 10 further includes a cylindrical outer surface 24 that is engaged with an inner sealing element 26 of the heavy-duty wheel seal 14. The wheel hub 12 includes a cylindrical inner surface 28 that is engaged with an outer carrier case 30 of the heavy-duty seal 14.

With reference to FIG. 2, the inner seal element 26 includes an inner metal case 32 that can have an L-shape cross-section including an axially extending cylindrical portion 32A and an annular portion 32B extending radially outwardly from an end of the cylindrical portion 32A.

The outer carrier case 30 can include an outer diameter first cylindrical portion 34, a first radially inwardly extending portion 36 extending from an end of the first cylindrical portion 34, a second cylindrical portion 38 extending from an inner end of the first radially inwardly extending portion 36, and a second radially inwardly extending portion 40 extending from a second end of the second cylindrical portion 38.

A support case 42 includes a first cylindrical outer diameter portion 44 that is received on an inside of the outer diameter first cylindrical portion 34 of the outer carrier case 30. The support case 42 further includes a radially inwardly extending portion 46 that can extend from a fold over section 48. The support case 42 can be supported within the outer carrier case 30 by a crimp end 49 of the first cylindrical portion 34 of the outer carrier case 30.

An inner seal overmold 50 is disposed on the inner metal case 32. The inner seal overmold 50 includes an inner diameter portion 52 that extends along an inner surface of the cylindrical portion 32A of the inner metal case 32 and is press-fit on the outer cylindrical surface 24 of the axle spindle 10. The inner seal overmold 50 further includes a first contaminant excluder lip 54 that extends radially outwardly and axially from an end of the cylindrical portion 32A of the inner metal case 32 and engages an inner surface of the second cylindrical portion 38 and the second radial portion 40 of the outer carrier case 30. The inner seal overmold 50 includes a second contaminant excluder lip 56 that extends radially outwardly and axially from an intermediate portion of the cylindrical portion 32A of the inner metal case 32 and engages an inner surface of the second cylindrical portion 38 of the outer carrier case 30.

The inner seal overmold 50 further includes an outward facing oil seal lip 58 that engages an axial face of the first radial portion 36 of the outer carrier case 30. The outward facing oil seal lip 58 includes hydrodynamic oil pumping grooves 60 on a face that engages the axial face of the first radial portion 36. The inner seal element 26 includes an inner seal spacer feature 62 extending axially from the annular portion 32B of the inner metal case 32, and opposing the radial portion 46 of the support case 42. The inner seal element 26 further includes a second spacer feature 64 extending axially from an end of the cylindrical portion 32A of the inner metal case 32.

The outer carrier case 30 is a thin-walled ring formed to retain the inner seal element 26 and the support case 42 in a cassette-type arrangement. The outer carrier case 30 has a cylindrical outer diameter which is press-fit into the wheel hub 12 forming a static seal and retaining the seal 14 within the hub 12. The outer carrier case 30 then rotates with the wheel hub 12. The carrier case 30 includes the first radial portion 36 extending from the air side of the outside diameter toward the inside diameter. This portion 36 provides an outer surface that can be used to press the seal assembly 14 into the hub inner bore 28 and an inner surface, which forms the rotating portion of the dynamic oil sealing interface. The outer carrier case 30 has the second cylindrical portion 38 at a smaller diameter that has an inside wall that forms a contact surface for the first and second contaminant excluder lips 54, 56. The second cylindrical portion 38 may also be formed with a slight draft or conical shape to cause any trace leakage past the oil seal lip 58 to drain back to the sealing interface where it can be transferred back to the hub. The outer carrier case 30 has the second radial portion 40 extending further inward in order to shield the excluder lips 54, 56 and forms a contact surface for an axial contacting excluder lip 54 and which further encapsulates and protects the inner seal element 26. The second radial portion 40 also provides a contact surface for the second spacer features 64 to prevent damage to the seal lips during disassembly of the hub 12.

The inner seal element 26 includes the metal case 32 and rubber overmold 50 and is nested inside the outer carrier case 30. The inside diameter of the inner seal element 26 is rubber coated and sized to retain the inner seal element 26 to the axle spindle and form a static seal against the axle spindle when the hub 12 containing the seal assembly 14 is mounted to the axle spindle 10. The spacer features 62 of the inner seal element 26 make contact with the support case 42, as the inner seal element 26 is press-fit to the axle spindle 10 during mounting of the hub 12. The spacer features 62 are located at the oil side "O" of the oil seal lip 58 to ensure that lubricant from the hub 12 can lubricate the contact surfaces between the spacer features 62 and the support case 42 and thereby reduce friction and heat from this contact area during use. The oil sealing main lip 58 extends radially outward toward the outside diameter of the seal 14 and axially so as to contact the inner surface of the first radial portion 36 of the outer carrier case 30 with an axial interference fit. Because the oil seal lip 58 is extending radially outward, centrifugal forces acting on the oil film that develops at the seal interface during use promotes the oil flow back to the oil side "O", enhancing the performance of the seal 14.

The oil seal lip 58 is shown including hydrodynamic grooves 60. However, it should be understood that the oil seal lip 58 can include an asymmetric profile, grooves, ribs, or other features to promote the sealing at the seal interface. The oil seal lip 58 forms the stationary portion of the dynamic oil sealing interface because it is attached to the axle spindle 10, which does not rotate. Because the oil seal lip 58 extends radially outward toward the outside diameter of the seal 14, it is exposed to lubricant even at speeds that would cause dry running conditions for lips positioned closer to the seal inside diameter as oil sealed within the hub is slung to the outer periphery of the hub cavity due to centrifugal effects. Because the oil seal lip 58 extends out toward the outside diameter of the seal 14, it is exposed to lubrication even when the level of lubrication is lower than would cause dry running conditions for a lip positioned closer to the seal inside diameter. The inner seal element 26 includes several contaminant excluder lips 54, 56 which have an interference fit with the outer carrier case 30 to form barriers that prevent contaminant entry from the vehicle operating environment. Grease may be packed in the cavities between the contaminant excluder lips 54, 56 to provide for lubrication of the excluder lips 54, 56, and to further prevent the infiltration of contaminants from the vehicle-operating environment. At the air side "A," the inner seal element 26 is provided with the second spacer feature 64 that is used to prevent over compression of the seal lip and which will contact the second radial portion 40 of the outer carrier case 30 during disassembly of the hub 12 from the axle 10, preventing damage to the seal lips during disassembly of the hub 12.

The support case 42 is a thin-walled ring that facilitates assembly and positioning of the inner seal element 26 within the axle assembly and to hold the inner seal element 26 within the outer carrier case 30. The support case 42 is nested within the outer carrier case 30 after insertion of the inner seal element 26 and is clamped in place by the crimped end portion 49 of the outer carrier case 30, holding it tight and stationary with respect to the outer carrier case 30 such that the support case 42 is attached to the outer carrier case 30 and rotates with the wheel hub 12. The support case 42 has an outer diameter portion 44 to locate the ring within the outer carrier case 30 and the radial portion 46 to support the inner seal element 26. The support case 42 can provide further protection of the oil seal lip 58 from dry running by forming a trough 70 to capture and retain lubricant at the sealing interface since the inside diameter of the support case 42 can be formed at a diameter smaller than the main lip 58 diameter. Additionally, the trough 70 formed between the outer carrier case 30 and the support case 46 can retain lubricant for the inner seal spacer features 62, which contact the support case 42. During assembly of the wheel hub 12 to the axle spindle 10, the support case 42 supports the inner seal element 26, as it is press-fit to the axle spindle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sealing arrangement, comprising:
   a stationary spindle having an outer surface;
   a wheel hub rotatably mounted to the spindle and including an inner bore; and
   a seal assembly disposed between the stationary spindle and the wheel hub, said seal assembly including:
   an outer carrier case having a first cylindrical portion disposed in the inner bore of the wheel hub and a first radial portion extending radially inward from an end of the first cylindrical portion,
   an inner seal element having an inner metal case having a cylindrical portion received on the outer surface of the stationary spindle and including an annular portion extending radially outwardly from an end of the cylindrical portion of the inner seal element and extending radially outward to be radially overlapping and axially spaced from the first radial portion of the outer carrier case, wherein an oil seal lip extends radially outwardly and axially from the annular portion of the inner metal case and engages the first radial portion of the outer carrier case, wherein the outer carrier case includes a second cylindrical portion extending from an inner end of the first radial portion in a direction opposite to the first cylindrical portion and the inner seal element includes a first contaminant excluder lip extending radially outwardly from the cylindrical portion and engaging an inner surface of the second cylindrical portion, wherein the outer carrier case includes a second radial portion extending radially inward from an end of the second cylindrical portion and said first contaminant excluder lip of said inner seal element engages said second radial portion.

2. The sealing arrangement according to claim 1, wherein the inner seal element includes a second contaminant excluder lip engaging the inner surface of the second cylindrical portion.

3. The sealing arrangement according to claim 1, further comprising a support case supported within the outer carrier case and including a radial portion that axially opposes the annular portion of the inner metal case.

4. The sealing arrangement according to claim 3, wherein the support case includes a cylindrical portion supported within the first cylindrical portion of the outer carrier case.

5. The sealing arrangement according to claim 3, wherein the annular portion of the inner metal case protrudes toward the radial portion of the support case.

6. The sealing arrangement according to claim 1, wherein the inner seal element includes an axially extending spacer feature extending from an end of the cylindrical portion toward the second radial portion of the outer carrier case.

7. A sealing arrangement, comprising:
a stationary spindle having an outer surface;
a wheel hub rotatably mounted to the spindle and including an inner bore; and
a seal assembly disposed between the stationary spindle and the wheel hub, said seal assembly including:
an outer carrier case having a first cylindrical portion disposed in the inner bore of the wheel hub and a first radial portion extending radially inward from an end of the first cylindrical portion,
an inner seal element having an inner metal case having a cylindrical portion received on the outer surface of the stationary spindle and including an annular portion extending radially outwardly from an end of the cylindrical portion of the inner seal element and axially spaced from the first radial portion of the outer carrier case, wherein an oil seal lip extends radially outwardly and axially from the annular portion of the inner metal case and engages the first radial portion of the outer carrier case, wherein the outer carrier case includes a second cylindrical portion extending from an inner end of the first radial portion in a direction opposite to the direction that the first cylindrical portion extends from the first radial portion and the inner seal element includes a first contaminant excluder lip extending radially outwardly from the cylindrical portion and engaging an inner surface of the second cylindrical portion, wherein the outer carrier case includes a second radial portion extending radially inward from an end of the second cylindrical portion and said first contaminant excluder lip of said inner seal element engages said second radial portion.

8. The sealing arrangement according to claim 7, wherein the inner seal element includes a second contaminant excluder lip engaging the inner surface of the second cylindrical portion.

9. The sealing arrangement according to claim 7, further comprising a support case supported within the outer carrier case and including a radial portion that axially opposes the annular portion of the inner metal case.

10. The sealing arrangement according to claim 9, wherein the support case includes a cylindrical portion supported within the first cylindrical portion of the outer carrier case.

11. The sealing arrangement according to claim 9, wherein the annular portion of the inner metal case protrudes toward the radial portion of the support case.

12. The sealing arrangement according to claim 7, wherein the inner seal element includes an axially extending spacer feature extending from an end of the cylindrical portion toward the second radial portion of the outer carrier case.

13. A sealing arrangement, comprising:
a stationary spindle having an outer surface;
a wheel hub rotatably mounted to the spindle and including an inner bore; and
a seal assembly disposed between the stationary spindle and the wheel hub, said seal assembly including:
an outer carrier case having a first cylindrical portion disposed in the inner bore of the wheel hub and a first radial portion extending radially inward from an end of the first cylindrical portion,
an inner seal element having an inner metal case having a cylindrical portion received on the outer surface of the stationary spindle and including an annular portion extending radially outwardly from an end of the cylindrical portion of the inner seal element and extending radially outward to be radially overlapping and axially spaced from the first radial portion of the outer carrier case, wherein an oil seal lip extends radially outwardly and axially from the annular portion of the inner metal case and engages the first radial portion of the outer carrier case, the oil seal lip including an oil pumping grooves; and
a support case supported within the outer carrier case and including a radial portion that axially opposes the annular portion of the inner metal case;
wherein the outer carrier case includes a second cylindrical portion extending from an inner end of the first radial portion in a direction opposite to the direction that the first cylindrical portion extends from the first radial portion and wherein the outer carrier case includes a second radial portion extending radially inward from an end of the second cylindrical portion and the first contaminant excluder lip of the inner seal element engages the second radial portion.

14. The sealing arrangement according to claim 13, wherein the support case includes a cylindrical portion supported within the first cylindrical portion of the outer carrier case.

15. The sealing arrangement according to claim 13, wherein the annular portion of the inner metal case protrudes toward the radial portion of the support case.

* * * * *